United States Patent [19]

Milliren et al.

[11] Patent Number: 5,417,880
[45] Date of Patent: May 23, 1995

[54] WATER BLOWN, ENERGY ABSORBING FOAMS

[75] Inventors: Charles M. Milliren, Coraopolis; Ronald Zibert, Burgettstown, both of Pa.

[73] Assignee: Miles Inc., Pittsburgh, Pa.

[21] Appl. No.: 319,832

[22] Filed: Oct. 6, 1994

[51] Int. Cl.$^6$ .............................. C08G 18/06
[52] U.S. Cl. ..................... 252/182.25; 252/182.26; 252/182.27; 521/174
[58] Field of Search ............... 252/182.25, 182.26, 252/182.27; 521/174

[56] References Cited

U.S. PATENT DOCUMENTS

| 3,926,866 | 12/1975 | Komatsu et al. | 260/2.5 AH |
|---|---|---|---|
| 4,116,893 | 9/1978 | Flanagan | 521/137 |
| 4,190,712 | 2/1980 | Flanagan | 521/137 |
| 4,212,954 | 7/1980 | Nomura et al. | 521/159 |
| 4,282,330 | 8/1981 | Austin | 521/118 |
| 4,371,629 | 2/1983 | Austin | 521/115 |
| 4,614,754 | 9/1986 | Christman | 521/167 |
| 4,866,102 | 9/1989 | Pray et al. | 521/137 |
| 5,143,941 | 9/1992 | Rossio et al. | 521/51 |
| 5,167,884 | 12/1992 | Rossio et al. | 264/45.5 |
| 5,187,204 | 2/1993 | Jackson et al. | 521/111 |
| 5,216,041 | 6/1993 | Rossio et al. | 521/137 |
| 5,232,957 | 8/1993 | Pritchard et al. | 521/174 |

Primary Examiner—Morton Foelak
Attorney, Agent, or Firm—Joseph C. Gil

[57] ABSTRACT

The present invention is directed to an isocyanate reactive mixture of specified amounts of a) a polyether polyol having a hydroxyl functionality of from 4 to 8 and having a hydroxyl number of from about 300 to about 450, b) a polyether polyol having a hydroxyl functionality of from 4 to 8 and having a hydroxyl number of from about 50 to about 200, and wherein at least 75% of the hydroxyl groups are primary hydroxyl groups, c) an adduct of a mono-, di-, or trialkanolamine and propylene oxide, said adduct having a hydroxyl number of from about 100 to about 800, and d) a polyoxyalkylene polyamine having a molecular weight of from about 2000 to about 5000, and containing from 2 to 3 primary amino groups. The invention is also directed to water-blown, energy absorbing foams made from the isocyanate reactive mixture.

2 Claims, No Drawings

WATER BLOWN, ENERGY ABSORBING FOAMS

BACKGROUND OF THE INVENTION

Energy absorbing foams based upon urethane chemistry are known in the art,. The early literature generally utilized halocarbon blowing agents (see, e.g., U.S. Pat. No. 3,926,866). A significant number of patents have issued relating to water blown energy absorbing foams based upon polyols ("filled polyols") prepared by polymerizing styrene/acrylonitrile monomer mixtures in polyethers (see, e.g., U.S. Pat. Nos. 4,116,893, 4,190,712, 4,212,954, 4,866,102, 5,216,041 and 5,232,957). Other patented technology describes the use of relatively low molecular weight crosslinkers (see, e.g., U.S. Pat. Nos. 4,282,330, 5,143,941, and 5,167,884) or the use of various polyols, such as ethylene oxide adducts of Mannich condensates (U.S. Pat. No. 4,371,629), alkoxylated toluene diamine (U.S. Pat. No. 4,614,754), or polyols derived from propylene glycol or ethylene diamine (U.S. Pat. No. 5,187,204).

While systems based upon some of the patents noted above have been used commercially, the search continues for systems which will produce energy absorbing foams which will meet a variety of specifications such as Ford specification WSB-M2D403-A3 for side impact, and which also meet commercial production processing requirements of 12 second mold closing and 3 minute demold. "Mold closing" is defined as the time from the start of the introduction of the foamable reactants into the mold until the mold is closed. "Demold time" is defined as the time from the start of the introduction of the foamable reactants into the mold until the finished part is removed from the mold.

DESCRIPTION OF THE INVENTION

A technology based upon a novel polyol mixture has now been developed which allows for the production of energy absorbing foams which meet the above-noted Ford specification and which meet the commercial production requirements of 12 second mold closing and 3 minute demold.

The novel polyol mixture unexpectedly allows for the use of a wide range of water levels to produce molded isocyanurate-group containing ("trimer") foams of varying densities—all of which exhibit good dimensional stability and a very uniform type of energy absorption. The water level can be adjusted easily to adjust the foam density and allow the foam to meet the above-noted Ford specification. This novel polyol mixture avoids the use of low molecular weight ethylenediamine based crosslinkers which tend to increase closed cell content and to therefore increase foam pressure in the mold. The novel mixture also does not require the use of filled polyols and still allows for the production of foams displaying very low molding pressures with good moldability.

The present invention is directed to an isocyanate reactive mixture and to a foam produced therefrom. More particularly, the isocyanate reactive mixture of the present invention comprises:

a) from about 20 to about 60% by weight of a polyether polyol having a hydroxyl functionality of from 4 to 8 and having a hydroxyl number of from about 300 to about 450, b) from about 10 to about 30% by weight of a polyether polyol having a hydroxyl functionality of from 4 to 8 and having a hydroxyl number of from about 50 to about 200, and wherein at least 75% of the hydroxyl groups are primary hydroxyl groups, c) from about 20 to about 60% by weight of an adduct of a mono-, di-, or trialkanolamine and propylene oxide, said adduct having a hydroxyl number of from about 100 to about 800 (and preferably from about 100 to about 200), and d) from about 10 to about 30% by weight of a polyoxyalkylene polyamine having a molecular weight of from about 2000 to about 5000, and containing from 2 to 3 primary amino groups, wherein the percents by weight are based upon the total weight of the isocyanate reactive mixture and wherein the percents by weight total 100%.

In addition, the present invention is directed to a water blown, energy absorbing foam produced by reacting:

A) the above-described isocyanate reactive mixture,

B) a polymethylene poly(phenyl isocyanate) containing from about 40 to about 85% by weight of methylene bis(phenyl isocyanate) and having an isocyanate group content of from about 20 to about 35% by weight (preferably from about 30 to about 35% by weight ;and most preferably from about 31 to about 33% by weight), with the amount of said isocyanate B) being such that the isocyanate index of the mixture of all the isocyanate reactive components and said isocyanate is from about 150 to about 250, and C) from about 4 to about 11 parts by weight per 100 parts by weight of component A) of water, in the presence of D) from about 0.5 to about 6 parts by weight per 100 parts by weight of component A) of a silicone surfactant, E) from about 1.0 to about 10 parts by weight (and preferably from about 2.5 to about 6.0 parts by weight) per 100 parts by weight of component A) of at least two different isocyanate trimerization catalysts, and F) from 0 to about 2 parts by weight per 100 parts by weight of component A) of a catalyst for catalyzing the reaction between isocyanate groups and hydroxyl groups.

The novel technology herein yields several unexpected findings in addition to those noted above. The use of the polyamine (Component A)d)) and a material which is generally used as a cell opener for flexible foams (Component A)b)) in combination with polyols which are typically used to produce rigid foams (Components A)a) and c)) surprisingly produced trimer foams with high open cell contents (i.e., >95% open cells) and low molding pressures. The combination of polyols resulted in a low viscosity isocyanate-reactive formulation. This aided processing by eliminating temperature buildup during recycling of reactants in the mixing equipment and improving mix quality. A further advantage is the ability of these foams to attenuate sound energy.

A further unexpected result was the ability to control foam hardness by altering the urethane catalyst (Component F)) while keeping the isocyanurate catalyst level constant. This, combined with the wide water level variability, gives the foam producer a number of choices on how to fine tune the system to meet a given energy absorbing foam specification. A further advantage of the most preferred system described herein is that the foam has a DNI rating on the FMVSS 302 test so that no flame retarding chemical additives are necessary. The isocyanate reactive formulation has a very low odor and the resulting foam has substantially no odor. Finally, the foams of the present invention may be overpacked by up to 50% to provide yet another means for adjusting the hardness of the molded part.

The foams of the present invention are water blown, energy absorbing foams broadly produced by reacting A) a specified isocyanate reactive mixture, B) a polymethylene poly(phenyl isocyanate), and C) water, in the presence of D) a silicone surfactant, E) at least two different isocyanate trimerization catalysts, and F) a catalyst for catalyzing the reaction between isocyanate groups and hydroxyl groups.

The isocyanate reactive mixture A) comprises the following four specific components: a) a polyether polyol having a hydroxyl functionality of from 4 to 8 and having a hydroxyl number of from about 300 to about 450, b) a polyether polyol having a hydroxyl functionality of from 4 to 8 and having a hydroxyl number of from about 50 to about 200, and wherein at least 75% of the hydroxyl groups are primary hydroxyl groups, c) an adduct of a mono-, di-, or trialkanolamine and propylene oxide, said adduct having a hydroxyl number of from about 100 to about 800 (and preferably from about 100 to about 200), and d) a polyoxyalkylene polyamine having a molecular weight of from about 2000 to about 5000, and containing from 2 to 3 primary amine groups.

Component A)d) is a polyoxyalkylene polyamine having a molecular weight of from about 2000 to about 5000, and containing from 2 to 3 primary amine groups. Such polyamines are known in the art. One method for preparing such amines is the amination of polyhydroxy polyethers (e.g., polypropylene glycols) by a reaction with ammonia in the presence of Raney nickel and hydrogen (Belgian Patent 634,741). U.S. Pat. No. 3,654,370 discloses the preparation of polyoxyalkylene polyamines by reaction of the corresponding polyol with ammonia and hydrogen in the presence of a nickel, copper, or chromium catalyst. The preparation of polyethers containing amino end groups by the hydrogenation of cyanoethylated polyoxypropylene ethers is described in German Patent 1,193,671. Other methods for the ! preparation of polyoxyalkylene polyamines are described in U.S. Pat. Nos. 3,155,728 and 3,236,895 and French Patent 1,551,605. Commercially available polyether polyamines are sold by Texaco under the Jeffamine tradename.

The polyols used in component A) and their methods of manufacture are generally known in the art. These are produced by the addition of epoxides (preferably ethylene and/or propylene oxide) either in admixture or successively, to compounds containing reactive hydrogen atoms. Examples of suitable reactive compounds for components A)a) and b)include pentaerythritol, sorbitol and sucrose, while mono-, di- and trialkanolamines are used to produce component A)c). In the case of component A)b), ethylene oxide is utilized to cap the polyol with the requisite content of primary hydroxyl groups.

The polymethylene poly(phenyl isocyanates) useful herein are known in the art and are produced by reacting phosgene with aniline/formaldehyde condensates. Known processes for preparing the aniline/formaldehyde condensates and the resultant polyisocyanates are described in the literature and in many patents, for example, U.S. Pat. Nos. 2,683,730, 2,950,263, 3,012,008, 3,344,162 and 3,362,979. The isocyanates useful herein contain from about 40 to about 85% by weight of methylene bis(phenyl isocyanate) and have an isocyanate group content of from about 20 to about 35% by weight, preferably from about 30 to about 35% by weight, and most preferably from about 31 to about 33% by weight. As noted above, the isocyanate index of the total system is from about 150 to about 250.

Water is used in an amount ranging from about 1 to about 11 parts by weight, and preferably from about 2.5 to 6.0 parts by weight, per 100 parts by weight of component A).

The silicone surfactants, which are used in amounts of from about 0.5 to about 6 parts by weight per 100 parts by weight of component A) are known in the art. Polyether siloxanes are particularly suitable silicone surfactants; especially useful are those which are water soluble. These compounds generally have a polydimethyl siloxane group attached to a copolymer of ethylene oxide and propylene oxide. Foam stabilizers of this kind are known and have been described, for example, in U.S. Pat. Nos. 2,834,748, 2,917,480 and 3,629,308. Also useful are the known polysiloxane surfactants generally used in the polyurethane art.

The reaction mixture must also contain at least two different isocyanate trimerization catalysts in an amount of from about 2.5 to about 10 parts by weight per 100 parts by weight of component A). Trimerization catalysts (i.e., catalysts which promote the polymerization reaction of isocyanate groups) are known in the art. Suitable trimerization catalysts include strong bases such as quaternary ammonium hydroxides (such as benzyl trimethylammonium hydroxide), alkali metal hydroxides (such as potassium hydroxide), and alkali metal alkoxides (such as sodium methoxide). Other suitable catalysts include materials of a more weakly basic nature such as alkali metal salts of carboxylic acids (such as sodium acetate, potassium acetate, potassium 2-ethylhexoate, potassium adipate and sodium benzoate), N-alkylethylenenimines, tris(3-dimethylaminopropyl) hexahydro-s-triazine, potassium phthalimide and tertiary amino phenols such as are described in U.S. Pat. No. 4,169,921 (such as 2,4,6-tris-(N,N-dimethylaminomethyl)-phenol). Examples of commercially available trimerization catalysts include hexa-hydro-1,3,5-tris(3-dimethylamino-propyl)-triazine sold as Pel-Cat 9640 from Ele Company and Polycat 41 from Air Products; 2,4,6-tris-(N,N-dimethylaminomethyl)-phenol sold as Pel-Cat 9529 from Ele and TMR-30 from Air Products; potassium organo-salt catalysts sold as Dabco K-15 from Air Products, Hexchem 977 from Hexchem, Polycat 46 from Air Products and Pel-Cat 9540A from Ele.

The reaction mixture can also contain a catalyst for catalyzing the reaction between isocyanate groups and hydroxyl groups (i.e., a urethane catalyst). The urethane catalysts are generally known and include tertiary amines such as triethylamine, tributylamine, N-methylmorpholine, N-ethylmorpholine, N-coco-morpholine, N,N,N',N''-tetramethyl-ethylene-diamine, 1,4-diazabicyclo-(2,2,2)-octane, N-methyl-N'-dimethyl-aminoethylpiperazine, N,N-dimethylbenzylamine, bis-(N,N-diethyl-aminoethyl)-adipate, N,N-diethylbenzylamine, pentamethyldiethylene-triamine, N,N-dimethylcyclohexylamine, N,N,N',N'-tetramethyl-1,3-butanediamine, N,N-dimethyl-$\beta$-phenylethylamine, 1,2-dimethylimidazole, 2-methylimidazole and the like. Also useful are the commercially available tertiary amines such as Niax A1 and Niax A107, available from Union Carbide; Thancat DD, available from Texaco; and the like. Mannich bases known per se obtained from secondary amines such as dimethylamine and aldehydes, preferably formaldehyde, or ketones such as acetone, methyl ethyl ketone or cyclohexanone and phenols such as phenol nonylphenol or bisphenol may also be used as catalysts. Silaamines having carbon-silicon bonds as described, e.g., in German Patent No. 1,229,290 and U.S. Pat. No. 3,620,984 may also be used as catalysts. Examples include 2,2,4-trimethyl-2-silamorpholine and 1,3-diethylamino-ethyltetramethyldisoloxane.

Organic tin compounds may also be used as catalysts according to the invention. The organic tin compounds used are preferably tin(II) salts of carboxylic acids such as tin(II) acetate, tin(II) octoate, tin(II) ethyl hexoate and tin(II)laurate and tin(IV) compounds such as dibutyl tin oxide, dibutyl tin dichloride, dibutyl tin diacetate, dibutyl tin dilaurate, dibutyl tin maleate or dioctyl tin diacetate. All the above-mentioned catalysts may, of course, be used as mixtures.

According to the invention, the components may be reacted together by known processes often using mechanical devices such as those described in U.S. Pat. No. 2,764,565. Details concerning processing apparatus which may be used according to the invention may be found in Kunststoff-Handbuch, Volume VII, published by Vieweg and Höchtlen, Cad-Hanser-Verlag, Munich, 1966, pages 121 and 205.

The foaming reaction for producing foam products is carried out inside molds. In this process, the foamable reaction mixture is introduced into a mold which may be made of a metal such as aluminum or a plastics material such as an epoxide resin. The reaction mixture foams up inside the mold to produce the shaped product. The process of foaming in molds is carried out to produce a product having a cellular structure on its surface. According to the invention, the desired result can be obtained by introducing just sufficient foamable reaction mixture to fill the mold with foam after the reaction is completed.

So-called external mold release agents known in the art, such as silicone waxes and oils, are frequently used when foaming is carried out inside the molds. The process may also be carried out with the aid of so-called internal mold release agents, if desired, in combination with external mold release agents, e.g., described in German Offenlegungsscriften Nos. 2,121,670 and 2,307,589.

The invention is further illustrated but is not intended to be limited by the following examples in which all parts and percentages are by weight unless otherwise specified.

EXAMPLES

In the examples which follow, the following materials were used:
A) POLYOL A: a sucrose/propylene glycol initiated-propylene oxide polyether having an average hydroxyl functionality of about 5.8 and having a hydroxyl number of 380.
B) POLYOL B: a sorbitol initiated-propylene oxide/ethylene oxide polyether (weight ratio of PO to EO of about 5:1) containing 100% primary hydroxyl groups, having a hydroxyl functionality of 6 and having a hydroxyl number of 100.
C) POLYOL C: a triethanolamine-initiated-propylene oxide polyol having a hydroxyl number of 150.
D) AMINE A: Jeffamine T-5000, a 5000 molecular weight polypropylene oxide triiamine, available from Texaco.
E) DC5103: a siloxane commercially available from Dow Corning.
F) K-15: Dabco K-15, potassium 2-ethylhexoate in diethylene glycol, commercially available from Air Products.
G) PC-46: Polycat 46, potassium acetate in ethylene glycol, commercially available from Air Products.
H) A1: Niax A1, a tertiary amine catalyst available from Union Carbide.
I) A1/LV: a 1:8 weight ratio mixture of A1 and LV.
J) WATER
K) X8136: Dabco X8136, a trimerization catalyst which is a quaternary ammonium salt mixture, commercially available from Air Products.
L) ISO: a polymethylene poly(phenyl isocyanate) containing about 45% by weight diisocyanate, having an isocyanate group content of about 31.5%, an equivalent weight of about 133, and a viscosity of about 200 mPa.s at 25° C., commercially available from Miles Inc.

In order to expedite the development herein, two screening procedures were used. The first procedure was a Fluidyne test procedure. Friable foams with good cure at 3 minutes and a uniform small cell structure were then sent to the second screening procedure.

In the second screening procedure, the components of the B-side were accurately weighed into a suitable container and mixed using an air driven two blade mixer. The resultant mixture was then taken to the metering equipment. The metering equipment was flushed with the mixture and calibrated for the desired foam index. The mixture was mixed with the isocyanate using high pressure metering equipment (HENNECKE HK100) and a Hennecke MQ-12-2 self-cleaning mixhead. Process settings were as follows:

| | | |
|---|---|---|
| TEMPERATURES (MIX and ISO): | 80° F. | (27° C.) |
| MIX PRESSURES (MIX and ISO) | 2500 psi | (17.5 N/mm$^2$) |
| MOLD TEMP | 150° F. | (66° C.) |
| MOLD RELEASE | PRC 1189C from Chemtrend | |
| DEMOLD TIME | 3 minutes | |

The reaction mixture was metered into a 10 inch×10 inch×2.5 inch (25.4 cm×25.4 cm×6.35 cm) mold (which had been previously sprayed with the mold release), in an amount sufficient to give the desired foam density. The mold was then closed and the foam part demolded after the reaction was complete. If the part did not post expand, split, have a cosmetically poor surface structure or shrink, it was submitted for further testing.

The formulations used were as reported in Table 1 (all amounts are in parts by weight). All the formulations passed the first screening procedure. While the foams of Examples 1, 2, 3 and 4 passed the first screening, the results for the second screening were not as good as desired. All four foams, however, would be imminently suitable for many energy absorbing applications. The foams of Examples I and 2 showed some splitting at the 3 minute demold, the foam of Example 3 showed coarse cell structure, and the foam of Example 4 was deemed too slow reacting for a 3 minute demold foam. The foams of Examples 5 and 6 passed both screening tests, with the foam of Example 6 deemed the best candidate for subsequent testing. The foam of Example 6 passed the Ford specification WSB-M2D403-A3 for side impact.

TABLE 1

FORMULATIONS

| Example | 1 | 2 | 3 | 4 | 5 | 6 |
|---|---|---|---|---|---|---|
| B-Side | | | | | | |
| POLYOL B | 20 | → | → | → | → | → |
| POLYOL C | 30 | → | → | → | → | → |
| POLYOL A | 30 | → | → | → | → | → |
| AMINE A | 20 | → | → | → | → | → |
| WATER | 9 | 6.5 | 5.5 | 6 | 6 | 6.2 |
| K-15 | 6 | 6 | 1.5 | 1.5 | 3 | 3 |
| A1 | — | — | — | — | 0.25 | 0.25 |
| A1/LV | 1 | — | — | — | — | — |
| DC5103 | 2 | 4 | → | → | → | → |
| PC46 | 2 | 2 | — | 3 | 3 | 3 |
| X8136 | — | — | 2 | — | — | — |
| Isocyanate | | | | | | |
| ISO | X | X | X | X | X | X |
| Isocyanate Index | 200 | → | → | → | → | → |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An isocyanate reactive mixture comprising:
    a) from about 20 to about 60% by weight of a polyether polyol having a hydroxyl functionality of from 4 to 8 and having a hydroxyl number of from about 300 to about 450,
    b) from about 10 to about 30% by weight of a polyether polyol having a hydroxyl functionality of from 4 to 8 and having a hydroxyl number of from about 50 to about 200, and wherein at least 75% of the hydroxyl groups are primary hydroxyl groups,
    c) from about 20 to about 60% by weight of an adduct of a mono-, di-, or trialkanolamine and propylene oxide, said adduct having a hydroxyl number of from about 100 to about 800, and
    d) from about 10 to about 30% by weight of a polyoxyalkylene polyamine having a molecular weight of from about 2000 to about 5000, and containing from 2 to 3 primary amino groups, wherein the percents by weight are based upon the total weight of the isocyanate reactive mixture and wherein the percents by weight total 100%.

2. The reactive mixture of claim 1, wherein the hydroxyl number of component c) is from about 100 to about 200.

* * * * *